United States Patent [19]
Arnott

[11] Patent Number: 5,279,368
[45] Date of Patent: Jan. 18, 1994

[54] ANTI-FOULING COVERING FOR USE IN SUB-SEA STRUCTURES

[75] Inventor: Thomas C. Arnott, Clackmannanshire, Scotland

[73] Assignee: British Pipe Coaters Limited, Edinburgh, Scotland

[21] Appl. No.: 842,122
[22] PCT Filed: Sep. 28, 1990
[86] PCT No.: PCT/GB90/01484
§ 371 Date: May 27, 1992
§ 102(e) Date: May 27, 1992
[87] PCT Pub. No.: WO91/05133
PCT Pub. Date: Apr. 18, 1991
[51] Int. Cl.$^5$ .............................................. E21B 17/01
[52] U.S. Cl. ..................... 166/356; 166/367; 138/143; 138/144
[58] Field of Search ............... 166/367, 356; 405/216, 405/166; 138/146, 143, 144

[56] References Cited

U.S. PATENT DOCUMENTS

| | | | |
|---|---|---|---|
| 3,091,262 | 5/1963 | Donaldson | 138/143 |
| 3,286,904 | 11/1966 | Veith et al. | 138/146 |
| 3,321,357 | 5/1967 | Kennedy | 138/146 |
| 3,553,970 | 1/1971 | Wiswell, Jr. | 405/216 |
| 3,740,958 | 6/1973 | Cadwell | 405/166 |
| 4,246,057 | 1/1981 | Janowski et al. | 138/146 |
| 4,306,821 | 12/1981 | Moore | 405/216 |
| 4,764,054 | 8/1988 | Sutton | 405/216 |

OTHER PUBLICATIONS

WO, A, 88/09460, Arnott et al, "Anti-fouling Covering for Sub Sea Structure", Dec. 1988.

*Primary Examiner*—Ramon S. Britts
*Assistant Examiner*—Frank S. Tsay
*Attorney, Agent, or Firm*—Malin, Haley, DiMaggio & Crosby

[57] ABSTRACT

An anti-fouling covering is applied to a tubular offshore structure to prevent fouling tubular goods by marine growth. The covering comprises metal sheeting which is deformed to provide spaced ridges or troughs which extend on the covering in the axial direction of the tubular goods. The deformations facilitate expansion and contraction of the covering but, especially when inwardly directed trough form, enable the covering to have substantially smooth exterior so that loading due to wave impingement can be reduced.

11 Claims, 4 Drawing Sheets

ANTI-FOULING COVERING FOR USE IN SUB-SEA STRUCTURES

This invention relates to a covering to protect tubular members of sub-sea structures particularly offshore structures from fouling by marine organisms or growths and also to a process for applying the covering. The present invention also relates to a tubular composite including an anti-fouling covering.

The fouling of marine structures by marine growths involving marine organisms is well known. Since these growths can adversely affect the wellbeing of the structure, it is necessary from time-to-time to carry out cleaning operations to remove the growths but there is the disadvantage that these cleaning operations are invariably costly. This problem can be particularly severe with tubular structures as these are generally immersed at considerable depths where marine growths such as mussel formation is especially prevalent.

To avoid or minimise the above problem it is known to cover or clad appropriate parts of the structure with copper or copper nickel plating, with insulating material located between the sheeting and the structure. Particular examples of such covering comprise (a) half-shells (for fitting around tubular members) and (b) copper-nickel wire mesh embedded in an elastomer or epoxy matrix. However a particularly advantageous for of anti-fouling sheet covering is described in the present applicants' International application PCT/GB88/00403 (published as W088/09460) which sheet covering comprises anti-fouling metal which is corrugated. In the preferred form of application of the corrugated sheeting to a tubular member, a corrugated metal strip of anti fouling material is wound onto an insulating layer, for example of elastomers or epoxies, on the tubular member such that the metal strip covers the tubular member.

It is an object of the present invention to provide an improved anti-fouling covering relative to the-covering of International application W088/09460.

According to one aspect of the present invention there is provided a covering to protect a tubular sub-sea structure from fouling by marine organisms, said covering comprising metal sheeting (13) wrapping the sub-sea structure (11) and serving to prevent or mitigate the build-up of fouling growths on the sub-sea structure (11), said metal sheeting (13) comprising corrugated sheeting whereby valley-form sheeting deformation (14) extend in the axial direction on the sub-sea structure characterized in that only a limited number of circumferentially spaced valley-form deformations (14) are present on the metal sheeting (13), the sheeting portion (13A) between the spaced deformations (14) comprising substantially plain metal.

The present invention is also a covering to protect sub-sea structures from fouling by marine growths comprising metal sheeting (13) wrapping the sub-sea structure (11) and serving to prevent or mitigate the build-up of fouling growths on the sub-sea structure (11), said metal sheeting (13) comprising corrugated sheeting whereby valley-form sheeting deformation (14) extend in the axial direction on the sub-sea structure characterized in that the metal sheeting (13) has at least one valley-form deformation (14, FIG. 3) which extends inwardly relative to the sub-sea structure (11), the sheeting portions (13A) on either side of said one valley-form deformation (14) being substantially plain.

Preferably the metal sheeting is in strip form with the deformation extending transversely on the strip, and preferably the deformation extends to opposed edges of the strip, i.e. each ridge or trough is defined by a corrugation. The metal sheeting is preferably of copper or copper nickel material.

Preferably the ridges or troughs are spaced by non-deformed areas on the sheeting such that the total area of the deformations is not greater than 70% of the total area of the sheeting, and preferably no greater than 40% of the total area: in a preferred embodiment the deformation area is less than 20% of the total sheeting area.

The present invention is also a tubular composite for use in a sub-sea structure; said tubular composite comprising a base tube, and an outer anti-fouling covering; said anti-fouling covering comprising anti-fouling metal sheeting which is deformed to provide spaced ridges or troughs.

Preferably no more than ten longitudinally-extending deformations are provided around the circumference of the tubular composite with respect to one cross-section of the composite.

According to another aspect of the present invention there is provided a process for applying an anti-fouling covering to a tubular member of a sub-sea structure to protect said member from fouling by marine growths, comprising the steps of applying a coating of elastomeric anti-corrosion material to the outer surface of the tubular member, applying anti-fouling sheet covering having valley form deformations to the elastomeric coating to enclose the tubular member whereby the valley-form deformations extend axially, applying a moulding pressure on the sheet covering to provide a restricting force thereto and to apply a bond between the sheet covering and the elastomeric material, and vulcanizing the elastomeric material, the arrangement being such that the deformations of the anti-fouling covering allow movement of any changes on the circumference of the elastomeric coating to be accommodated during and after the vulcanization process without undue stress on the bond between the coating and the sheet covering characterized in that for the anti-fouling sheet covering there is used metal sheeting provided with only a limited number of valley-form deformations, the sheeting portions between valley-form deformations comprising substantially plain metal.

The anti-fouling sheet covering is preferably applied by winding strip material around the tubular member. The strip can have any suitable width, say for example 150 mm, and thickness say 0.5 mm to 2 mm. The deformation can be applied to the sheet material by means of suitable metal deforming apparatus or by a metal stamping machine, and the size (height) of the deformations can be selected as desired, the deformation height generally being dependent on the diameter of the tubular member to be covered.

Before it is applied to the elastomer coating, the strip will be chemically or mechanically cleaned and a bonding agent is preferably applied on the strip surface contacting the elastomer coating.

According to a further aspect of the present invention, there is provided an anti-fouling covering assemblage for fitting to a tubular structure comprising a plurality of part circular, preferably semi-circular, covering units (41A), 41B) each unit including a metal sheeting part (13), characterized in that the sheeting parts (13) provide at least one valley-form indentation or corrugation, when the assemblage is fitted on a tubular structure (11)k, sheeting portions on either side of the valley-form indentation (14) being of substantially plain form.

Preferably the sheeting parts are bonded to a coating layer for location between the sheeting and the tubular structure, and the assemblage can be secured to a tubular structure, e.g. pipe by any suitable means, for example by straps or bands.

By means of the present invention, the metal sheet covering can represent a substantially clean cylinder without major exterior obstructions and this will encourage lower loading to be encountered during fluid loading when in use in a sub-sea environment. However, the indentation will facilitate expansion and contraction in the covering.

Embodiments of the present invention will now be described by way of example with reference to the accompanying drawings wherein.

Figure 4:
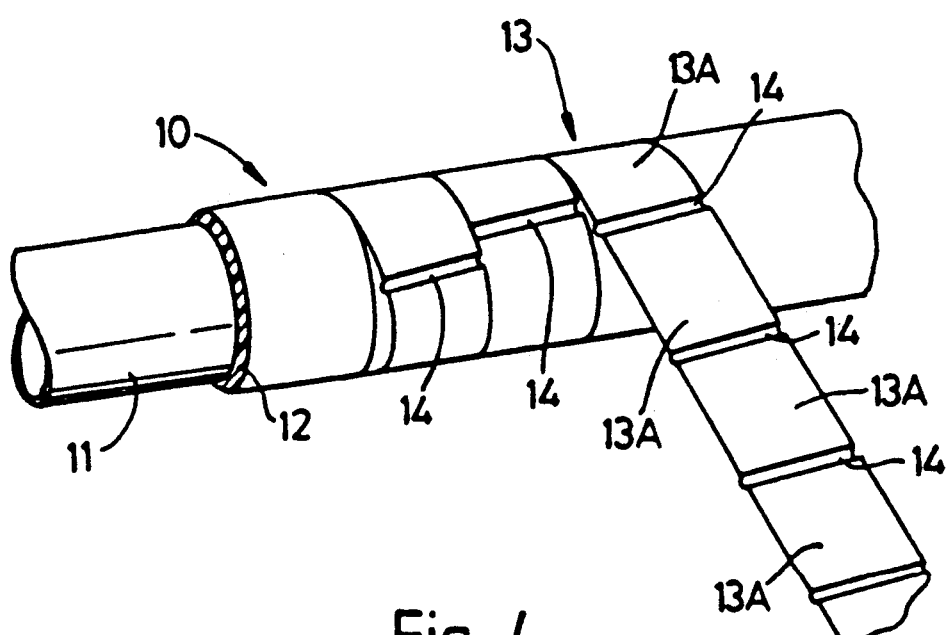
FIG. 4 shows a schematic view of the covering being applied to a pipe.

Referring to the drawings, FIG. 4 illustrates the formation of a protected tubular marine structure, i.e. sub-sea structure 10 in this embodiment, more especially a covered pipe 11 for the supply or delivery of fluid, and it is shown with portions cut away for clarity. Other tubular structures, such as legs or jackets of off-shore structures, may be similarly protected.

Figure 3:
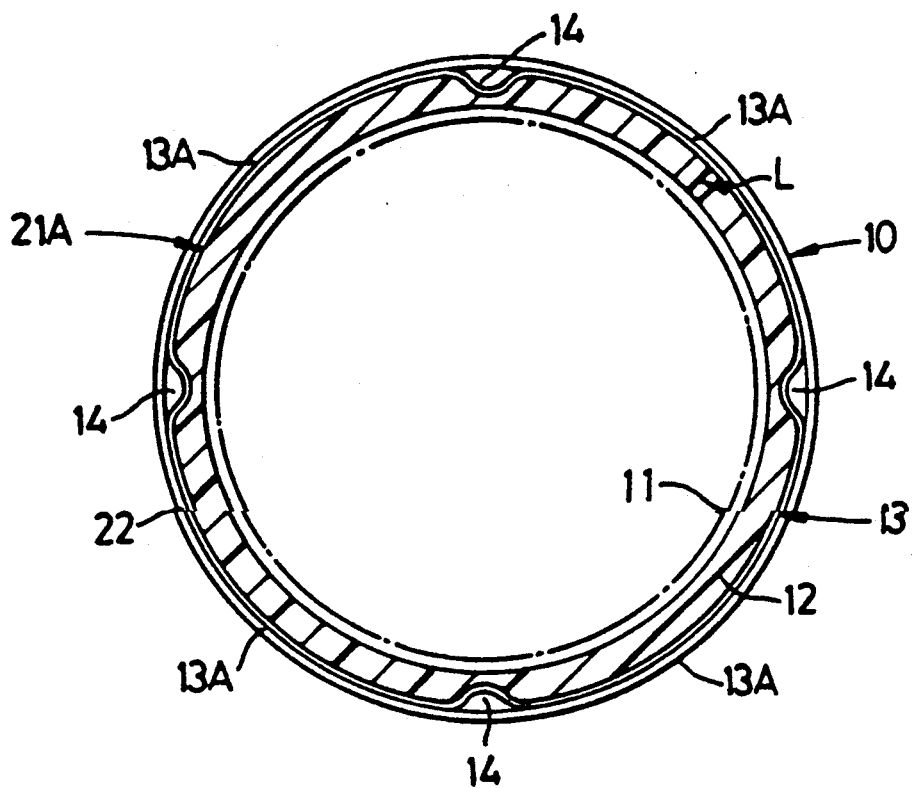
FIG. 3 shows an end view of the covering as fitted to a pipe or conduit.

The structure 10 comprises a length of steel pipe 11 the outer surface of which is completely coated with an anti-corrosion material 12 and then totally encapsulated with a strip of anti-fouling metallic material 13 such as copper or copper nickel. The strip is applied in a spiral manner by hand or by machine while rotating the coated pipe. Prior to application to the coated pipe 11, the metallic strip 13 is deformed to provide a series of transverse indentations 14, each in the form of a corrugation, the indentations 14 extending from one side of non-deformed surface portions 13A as is best seen in FIG. 3, the size of each surface portion 13A defining the spacing of the indentations. The indentations (corrugations) 14 can be applied by means of suitable metal deforming apparatus, such as roller apparatus or a metal stamping machine.

Also, the metallic ridged strip 13 is chemically or mechanically cleaned and a bonding agent is applied to the surface of the strip contacting the material 12 before the strip is wound onto the coated pipe 11.

When the strip 13 is wound spirally onto the pipe 11, the indentations 14 extend longitudinally or essentially longitudinally of the pipe to form inwardly directed troughs (as can be seen in FIG. 3). The convulations of the spirally would strip 13 may be arranged simply to have edge abutment but a slight overlap of the convulations would also be possible to ensure satisfactory covering of the pipe.

The anti-corrosion coating 12 may be an epoxy resin which after the metal strip has been wound into the pipe, is cured chemically in a manner known per se in the art. Preferably however, the anti-corrosion coating is an elastomeric material.

Once the strip 13 has been wound onto the pipe 11 coated with an elastomeric material, a temporary covering, not shown is wrapped-around the metallic covering, e.g. a nylon tape applied at high pressure, e.g. 70–120 Kilos to provide a restricting force, over the full length of the metallic covering, and thereafter the elastomeric material is vulcanised at, for example 110°0 to 170° C. to form an elastomer. On completion of the vulcanisation process the temporary covering can be removed.

The space between the strip covering 13 and the pipe 11 is fully filled with elastomeric material 12, the winding of the strip 13 onto the coated pipe 11, (using the application process above described) resulting in the troughs 14 pressing into the coating 12. On cooling after vulcanisation, the differential in contraction of the elastomer and metal covering is accommodated due to the strip covering having the ability to have annular displacement (by virtue of the troughs 14) or even deform. On contraction of the elastomer the deformation of the metal covering is therefore evenly distributed.

Figure 7:
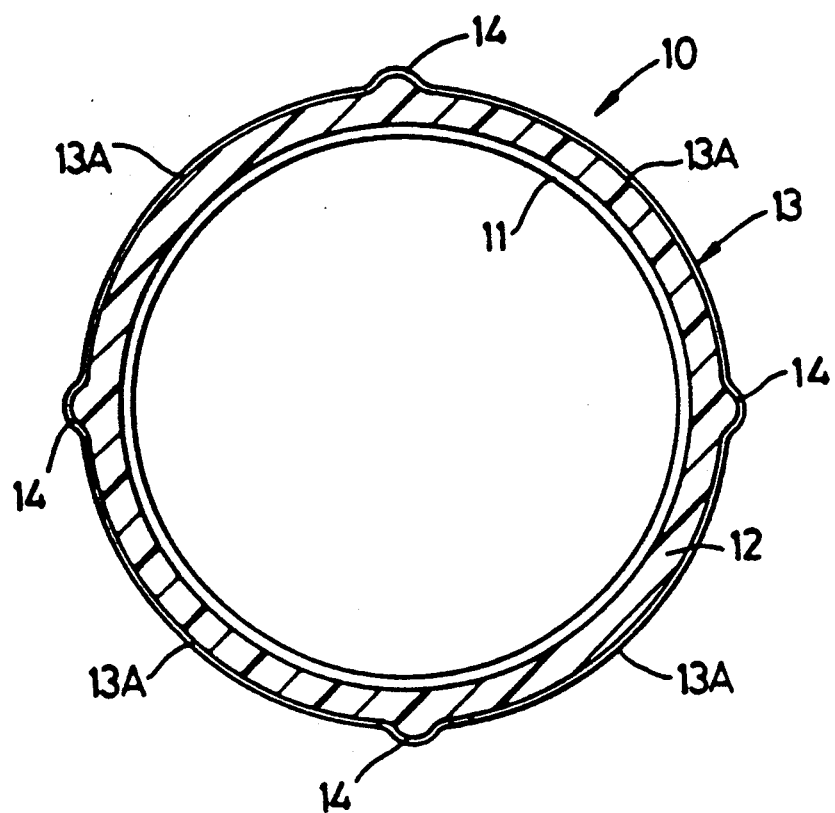

The elastomer bond so formed can now accommodate the differing rates of contraction and expansion of the elastomer 12 and anti-fouling strip 13 by virtue of the troughs 14. Furthermore the elastomer vulcanised within the troughs 14 as shown in FIG. 7 will enable the anti-fouling strip 13 to better withstand impacts.

Figure 1:
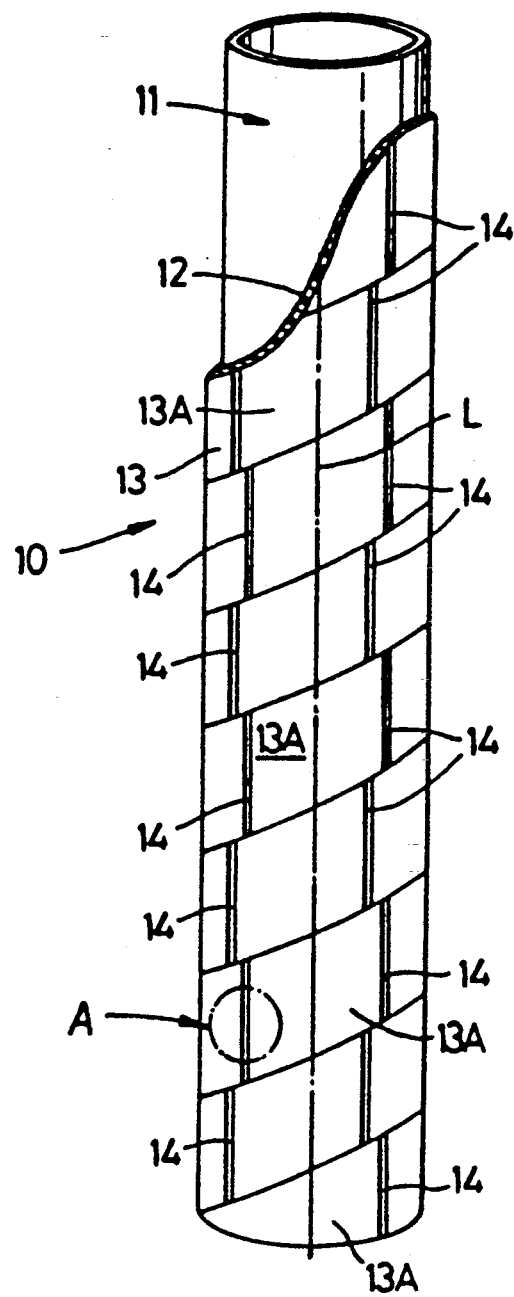
FIG. 1 shows a schematic pictorial view of a covering of the present invention applied to a pipe.
Figure 2:
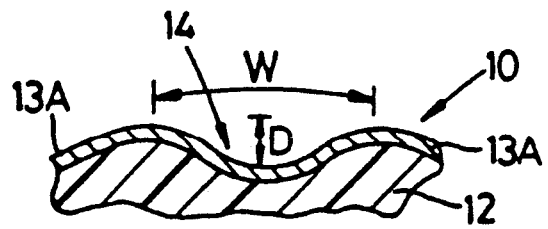
FIG. 2 shows the deformed, trough, part of portion A of FIG. 1 to a larger scale.

It is a feature of the arrangement that only a limited number of troughs 14 are arranged on the circumference of the covered pipe 11 (considered with regard to a single cross-section of the covered pipe as shown on FIG. 3—in practice a series of staggered deformations 14 will be present along the length of the pipe as shown in FIG. 1. In particular 4 such troughs 14 are present in FIG. 3 and it is preferable that there should be no more than about 10: consequently the total area of the indent ridges 14 will in general be less than 20% of the total area of the strip 13 and in any event will be no more than 70% of the strip total area.

The profile of the indentation 14 will be suitably chosen, particularly with regard to the width (W) to depth (D) ratio of the indentation and this will be especially dependant on the diameter of the pipe, but by way of example W/D could be greater than two. Only a limited number of indentations 14 are present circumferentially at one section, but preferably two or more are present. In any event it is preferred that the projected circumferential area of the indentations 14 in combination (conveniently calculable using dimension W) is not greater than 20% of the total circumferential area of the covering. The coating 12, for example 6 mm thick can be formed from polychloroprene (elastomer), while the metal sheeting 13 can comprise a 90/10 cupronickel cladding. A break 20 in the electrical continuity of the anti-fouling covering can be present; and introduced after the covering has been applied.

The above covering arrangement conveniently allows expansion and contraction of the pipe 11 and elastomer coating 12 to occur during manufacture or in service, while preventing or limiting stress between the layers of the metal sheeting 13 and the coating 12. Further, the outer surface of the covering is essentially of a clean form without substantial obstruction, and indeed can approximate closely to a smooth cylinder, with the result that the co-efficient of drag (Cd) is kept to a low level so keeping fluid loading on the pipe assembly low when in use in a sub-sea environment. The smooth covering form also avoids obstructions when the assembly is passing through guides and clamps during handling at the fabrication site.

In the case of a fully corrugated covering, waves will be able to get a more pronounced "grip" on the covering so increasing the wave loading on the covered pipe (or tubular member), but such wave loading will be considerably reduced when a covering strip of the present invention is utilised.

The use of fewer corrugations will enable the use of less amount of material (for the same sheet thickness) to cover a given tubular area.

Figure 5:
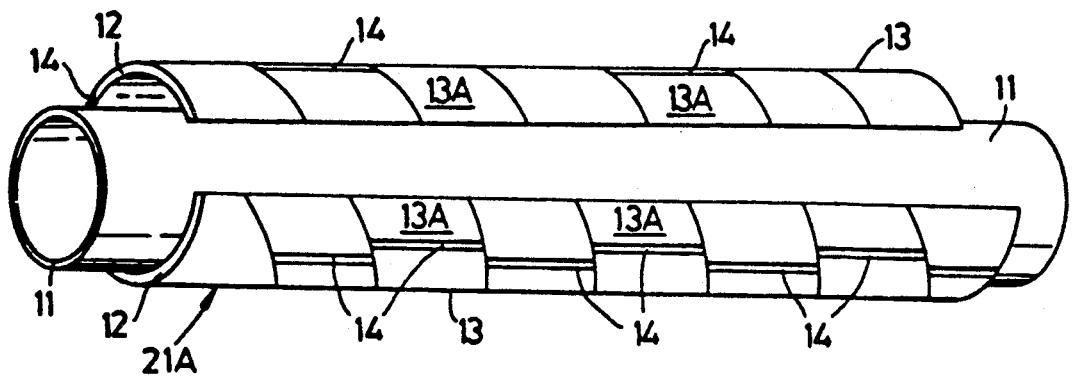
FIG. 5 shows a retro-fit covering assemblage in accordance with the present invention.
Figure 6:
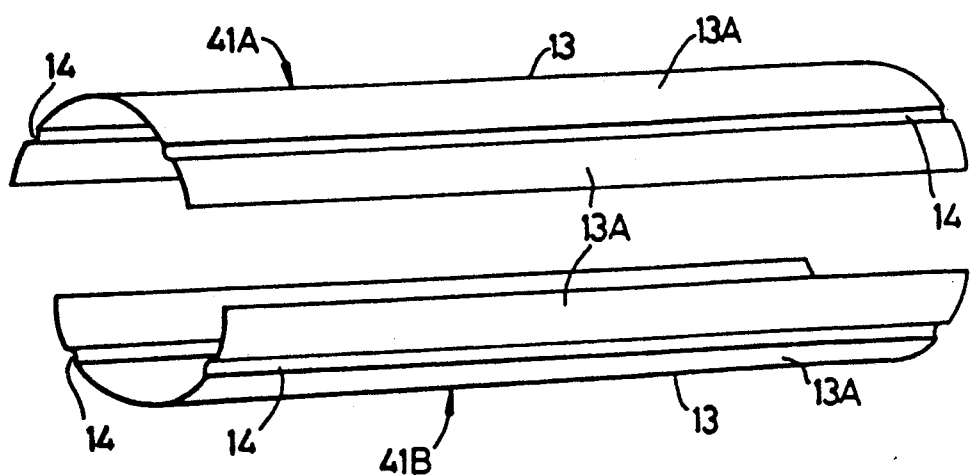
FIGS. 6 and 7 shows further forms of covering unit.

While the above related to a complete covered pipe assembly 10, it would be possible to have the covering as a separate asemblage to serve as a retro-fit system on an existing pipe installation In an example of forming such an assemblage, the previously described covered pipe forming procedure could be utilised generally but in this case no bonding agent would be present between the pipe 11 and the coating 12 so preventing a bond between the pipe and the elastomer coating—the pipe 11 effectively serving as a form of mandrel. The metal sheeting 13 would be applied as previously. After the covering has been formed and the coating cured, this covering will be cut longitudinally as indicated at L in FIG. 3 (and by dashed line L in FIG. 1) and possibly also circumferentially at convenient lengths (for example at 2 meters). The assemblage 21A, (shown in FIG. 5) can then be removed from the pipe/mandrel 11 by virtue of the flexibility of the assemblage, and placed in readiness for fitting to existing tubulars of similar size, for example off-shore. The assemblage 21A, can be secured on the tubular by any suitable means, for example by straps or bands 22. In an alternative arrangement shown in FIG. 6 integral one-piece semi-circular metal sheets are used to form integral parts 41A, 41B, formed for example by stamping on a die/mandrel, and the coating 12 can be applied at an appropriate time.

The spacing of the deformations 14 and the (helix) angle of the deformations 14 relative to the tubular member axis will be determined by the diameter of the tubular member and by the likely environmental conditions in which the member operates. Sub-sea structures including covered tubular members in accordance with the present invention can be used in both shallow and deep water environments.

Instead of having the deformations 14 as inwardly directed troughs, it ay be preferred in some circumstances to have the deformations 14 of the covering as outwardly directed ridges as shown in FIG. 7 but a limited number of these ridges would be present just as in the case of troughs. In the formation of the covering with ridges, the elastomer 12 will flow into the convex spaces of the ridges during vulcanisation. In a further modification, the anti-fouling strip could have a combination of ridges and troughs (circumferentially spaced by on-deformed metal sheet portions.

I claim:

1. A covering to protect a tubular subsea structure from fouling by marine organisms, said covering comprising:

means wrapping the subsea structure including metal sheeting and serving to prevent or mitigate the buildup of fouling growths on the subsea structure, said means comprising a helically wound strip means defining a series of spaced valley-form deformation means extending transversely on the strip means, portions of said strip means between the deformation means being substantially planar, said deformation means being arranged such that, when the means wrapping the subsea structure is located on the tubular structure to be protected, at least one deformation means is present circumferentially in each 360' turn of said strip means.

2. A covering to protect a tubular subsea structure from fouling by marine organisms, said covering comprising:

means wrapping the subsea structure including metal sheeting and serving to prevent or mitigate the buildup of fouling growths on the subsea structure, said means comprising a helically wound strip means defining a series of spaced valley-form deformation means extending tranveresely on the strip means, said strip means applied to the tubular structure so that the covering defines valley-form deformation means which are radially inwardly directed, portions between the deformation means being substantially planar, said deformation means being arranged such that when the means wrapping the subsea structure is located on the tubular structure to be protected, at least one radially inwardly directed deformation means is present circumferentially in each 360° turn of said strip means.

3. A covering as claimed in claim 1 or 2, wherein said deformation means extends to opposed edges of said strip means.

4. A covering as claimed in claim 1 or 2, wherein the metal sheeting is of copper or copper/nickel material.

5. A covering as claimed in claim 1 or 2, wherein at any one transverse section of the covering, there are no more than ten of said deformation means present for each 360° turn of said strip means.

6. A covering as claimed in claim 1 or 2, wherein the covering comprises a flexible, open-sided, annular assemblage which is deformable to fit into a tubular member.

7. An anti-fouling covering assemblage for fitting to a tubular structure, comprising:

a plurality of substantially semi-cylindrical covering means, each covering means including a metal sheeting part, said sheeting parts providing at least one valley-form deformation means, such that when the assemblage is fitted on a tubular structure, portions between the deformation means are substantially planar.

8. The assemblage as in claim 7, wherein the valley-form deformation means is inwardly directed.

9. The assemblage as in claim 7 or 8, wherein the sheeting parts are bonded to a coating layer, said coating layer being located between the sheeting and the tubular structure.

10. A tubular composite for use in a subsea structure, said tubular composite comprising a base tube and an outer anti-fouling covering means wrapping the base tube, said anti-fouling covering means comprising anti-fouling metal sheeting which is deformed to provide ridges and troughs, said metal sheeting being formed by helically wound strip means, said strip means defining a series of spaced valley-form deformation means extending transversely on the strip means, portions of said strip means between the deformation means being substantially planar, said deformation means arranged such that, when the sheeting is located on the tubular structure to be protected, at least one deformation means is present circumferentially in each 360° turn of said strip means.

11. A process for applying an anti-fouling covering to a tubular member of a subsea structure to protect said member from fouling by marine growths, said process comprising the steps of applying a coating of elastomeric anti-corrosion material to the outer surface of the tubular member, applying anti-fouling sheet covering having valley-form deformations to the elastomeric coating to enclose the tubular member whereby the valley-form deformations extend axially, and are present in each transverse section of the tubular member applying a molding pressure on the sheet covering to provide a restricting force thereto and to apply a bond between the sheet covering and the elastomeric material, and vulcanizing the elastomeric material, the arrangement being such that the deformation of the anti-fouling covering allow movement of any changes on the circumference of the elastomeric coating to be accommodated during and after the vulcanization process within undue stress on the bond between the coating and the sheet covering, wherein the anti-fouling sheet covering comprises strips wound helically on the elastomeric coating, said strip having spaced deformations which extend transversely on the strip and provide said valley-form deformations of the covering, the strip portions between the spaced deformations being substantially plain.

* * * * *